United States Patent [19]

Melody et al.

[11] 4,430,480

[45] Feb. 7, 1984

[54] TWO-PART COMPOSITION WITH ACTIVATOR ENRICHED WITH DIHYDROPYRIDINE INGREDIENTS

[75] Inventors: David P. Melody; Seamus M. Grant; Francis R. Martin, all of Dublin, Ireland

[73] Assignee: Loctite Corporation, Newington, Conn.

[21] Appl. No.: 321,643

[22] Filed: Nov. 16, 1981

[30] Foreign Application Priority Data

Nov. 21, 1980 [IE] Ireland .................................. 2423/80

[51] Int. Cl.³ ............................................. C08L 61/26
[52] U.S. Cl. .................................... 525/160; 525/110
[58] Field of Search ............... 525/160, 302, 518, 164, 525/939; 528/269, 248

[56] References Cited

U.S. PATENT DOCUMENTS

| 3,890,407 | 6/1975 | Briggs, Jr. ....................... 260/878 R |
| 3,962,372 | 6/1976 | Arhart ............................. 260/878 R |
| 4,106,971 | 8/1978 | Briggs, Jr. et al. ................ 156/310 |
| 4,112,013 | 9/1978 | Briggs, Jr. et al. ............. 260/878 R |
| 4,230,834 | 10/1980 | Sirota ................................. 528/269 |

OTHER PUBLICATIONS

Patrick, Jr., Journal of the American Chemical Society, vol. 74 (1952) p. 2984.
Craig et al., Journal of the American Chemical Society, vol. 70 (1948) p. 1624.

*Primary Examiner*—Theodore E. Pertilla
*Attorney, Agent, or Firm*—Walter J. Steinkraus; Eugene F. Miller

[57] ABSTRACT

An improved two-part adhesive composition comprising as a first part monomer-in-polymer polymerizable solution and a second part, an activator enriched in its N-phenyl-3,5-diethyl-2-propyl-1,2-dihydropyridine content. The content is enriched to a concentration of at least about 70% of the second part.

6 Claims, No Drawings

TWO-PART COMPOSITION WITH ACTIVATOR ENRICHED WITH DIHYDROPYRIDINE INGREDIENTS

SUMMARY OF THE INVENTION

This invention relates to a two-part, improved composition comprising: a first part comprising a solution of a chlorosulfonated polyethylene in at least one polymerizable vinyl monomer; and a second part comprising an activator composition which is formed from the condensation reaction of butyraldehyde and aniline, and containing no more than about 50% by weight of a substituted dihydropyridine, wherein the improvement comprises enriching the content of N-phenyl-3,5-diethyl-2-propyl-1,2-dihydropyridine (hereinafter DHP) to a concentration of at least about 70% by weight of said second part. The other condensation products in the second part should not exceed 30% of the weight of the second part nor exceed 42% of the weight of the DHP. This enrichment results in a novel purified form of the activator which can be obtained by a variety of isolation and separation techniques to reduce the slipperiness, oily texture, obnoxious color and odor of the prior art activators.

BACKGROUND OF THE INVENTION

Reactive fluid compositions, otherwise known as tough acrylic adhesive compositions, are well known in the art as excellent adhesive systems. Typically, these are two-part systems which offer the advantage of rapid cure and high strength along with good shelf life. Curing of these compositions occurs in the presence or absence of air at room temperature, resulting in tough, elastomeric bonds. It is ordinarily not necessary to carefully prepare the surface prior to bonding because these compositions are not particularly sensitive to dirt, grease or other matter which affects surface bondability.

The first main component of the adhesive composition is generally comprised of polymer-in-monomer solutions. Typically, these adhesive compositions are vinyl or acrylic monomers containing chlorosulfonated polyethylene, with a Brookfield viscosity of up to one million. Chlorosulfonated polyethylene is generally the reaction product of a linear or branched polyethylene and sulfonyl chloride and is commercially available under E. I. DuPont De Nemours' & Co. trademark Hypalon. Such adhesive compositions are disclosed in U.S. Pat. Nos. 3,890,407, 3,962,372, 4,106,971 and 4,112,013, which are hereby incorporated by reference.

A mixture or solution of accelerators, promotors, initiators, and free radical generators, all generally defined in the above-mentioned patents as polymerization catalysts, are generally the other main component of the reactive fluid compositions. It is often useful to include one or more of these catalysts in the first part of the composition (monomer portion) as well as the second part.

Examples of typical prior art free radical generators are organic peroxides, hydroperoxides, peresters, persalts and peracids. Amines, such as N,N-dimethylaniline, are ordinarily employed as initiators, and transition metals such as manganese or nickel serve as promoters.

The accelerators of the prior art are generally comprised of amine-aldehyde condensation products. Typically, these accelerators are the products of the reaction between an aliphatic aldehyde ($C_{1-12}$) and an aromatic amine (maximum of 18 carbons). U.S. Pat. No. 3,890,407 lists the various amines and aldehydes useful as condensation reactants. The reaction between butyraldehyde and aniline produces a condensation product mixture which is a particularly useful accelerator. A well known commercial accelerator of this specific reaction is marketed by E. I. DuPont De Nemours & Co. under the trademark DuPont 808. The term "accelerator" is commonly used in the art as synonymous with the terms "activator" and "primer." For purposes of this invention, the term "activator" will mean the mixture or solution of products formed by the condensation reaction of an amine and an aldehyde.

The amine-aldehyde condensation reaction is not an addition reaction which results in the high purity yield of simple adduct. Rather, there is a variety of resulting reactions and products which can occur, e.g., see U.S. Pat. Nos. 1,780,334, 1,908,093 and 2,704,750. Research has been conducted on improving the yield of the aldehyde-amine adduct through various mechanisms. For example, see Patrick, "The Reaction of Aldehydes with Amines", Journal of the American Chemical Society, 1952, Vol. 74, page 2984; and Craig, "N-phenyl-3, 5-diethyl-2-propyl-1, 4-dihydropyridine", Journal of the American Chemical Society, Vol. 70, pg. 1624, 1948; U.S. Pat. No. 2,704,759 to Patrick.

In most instances in these prior art adhesive compositions, the amine-aldehyde solution or mixture is the second part of a two-part composition, the first part being the polymer-in-monomer portion. Usually, the activator portion is applied to one or both surfaces to be joined, prior to application of the first part. It is especially necessary to apply activator to both surfaces to be bonded if there is a large or irregular gap between the surfaces to be bonded. In such cases, the adhesive must be applied to one of the activated surfaces coated with activator before assembly of the parts. Frequently, the geometry or orientation of the assembly parts dictates whether or not the adhesive must be applied over the surface primed with the activator or whether one assembly part can be coated with activator and the other part coated with the adhesive composition.

One present disadvantage to the prior art adhesive systems which use aldehyde-amine condensation products as surface activators is that the adhesive compositions do not readily adhere to the oily surface of the activator. The adhesive tends to slip or "skate" along the surface of the activator and to flow off the bond area prior to assembly. In slip-fit assemblys, e.g., where a rod is to be loosely fitted into a tube, the adhesive is pushed out as the parts are mated. This problem is magnified when the parts to be assembled are positioned or oriented such that gravity accentuates the slippage. Even on a flat surface it is difficult to apply the adhesive onto the activated area, because as the assembly parts are pushed together, the adhesive slips out of the overlapping joint area.

This "skating" of the adhesive off the activated surface is believed to be caused by a variety of substances which prevent proper wetting and interaction of the adhesive with the surface to be bonded. The "active ingredient", e.g., the ingredient in the activator which is believed to react with the polymerizable portion of the adhesive composition, causing an acceleration of polymerization, is thought to be a substituted dihydropyridine compound. For example, in the condensation reaction between butyraldehyde and aniline, the substituted dihydropyridine compound is believed to be N-phenyl-3,5-diethyl-2-propyl-1,2-dihydropyridine. Due to the nature of the condensation reaction used to make amine-aldehyde activators, many other compounds are formed which do not enhance the activator's ability to function as an accelerator and which cause the polymerizable portion (polymer-in-monomer part) of the adhesive composition to slide off the surface of an activator-coated part. The result is poor wetting of the surface by the adhesive, resulting in low bond strength. Additionally, these non-contributing products, which in the context of the intended use of the activators can be considered by-products, impart an obnoxious odor and a brown staining color which require ventilation and precautionary handling measures and cause aesthetic imperfections in the surfaces to be bonded, particularly on those surfaces on which the bondline is visible. The polymerizable portion of the adhesive composition is generally a clear, viscous material, but when in contact with the activated surface takes on the brown dirty color of the activator.

It is apparent that a need exists for an activator which has all the advantges of the prior art activators, yet does not cause the skating problems, odor and color problems associated with those activators. It is the intention of the instant invention to overcome those disadvantages, while maintaining the excellent acceleration properties which are commonly possessed by these amine-aldehyde condensation products.

DETAILED DESCRIPTION OF THE INVENTION AND ITS PREFERRED EMBODIMENTS

This invention concerns a two-part adhesive composition comprising, (i) a first part comprising a solution of a chlorosulfonated polyethylene in at least one polymerizable vinyl monomer, a polymerization catalyst, said catalyst comprising at least one or more combinations of a free-radical initiator and a promoter or accelerator of free-radical initiation; and (ii) a second part comprising an activator composition which is the condensation reaction products formed by the reaction of butyraldehyde and aniline, and containing no more than about 50% by weight of a substituted dihydropyridine, wherein the improvement comprises enriching the content of N-phenyl-3,5-diethyl-2-propyl-1,2-dihydropyridine (hereinafter called DHP) to a concentration of at least about 70% by weight of said second part.

The activator may be comprised of DHP or, as mentioned above, may optionally contain other butyraldehyde-aniline condensation reacton products, where the concentration of such products does not exceed 42% by weight of the DHP, or a solution or mixture of either of these in a volatile, non-reactive, organic solvent such as chlorinated solvent, e.g., 1, 1,1,-trichloroethane. To prepare the activator, any commercially available mixture or solution of butyaldehyde-aniline condensation products may be enriched in DHP by standard laboratory separation techniques, or the condensation reaction could be conducted from the starting materials of butyraldehyde and aniline as described by Craig, et al. in the "Journal of American Chemical Society," Vol. 70, p. 1624, 1948.

Distillation, chromatography and various other acceptable techniques known in the art may be effectively employed in isolating the DHP from other condensation products. Fractional distillation is the preferred separation method. Any number of fractions containing about 70 to about 100% of DHP can be isolated for activators for the above-mentioned adhesive compositions. The boiling points of the fractions generally range from about 125° to about 155° at approximately 0.5 mmHg. It is most preferable to have an activator with a DHP content of about 80 to about 98% by weight of the activator, in a solution of 1,1,1-trichloroethane.

As previously mentioned, an example of a commercially available activator comprised of butyraldehyde-aniline condensation reaction products is marketed under the trademark DuPont 808 by E. I. DuPont De Nemours & Co. Such an activator can be enriched most effectively in percent by weight of DHP, to within the ranges stated above, by means of fractional distillation. The condensation products other than DHP should not be present in quantities greater than about 30% of the weight of the respective fractions or 42% of the weight of the DHP in the respective fraction.

A particular advantage is obtained by including in the activator a small proportion, e.g., about 2 to about 20% by weight, of a thickener such as an organic polymer or prepolymer. Considerable improvement in bond strength on porous substrates such as wood is obtained when the primer is thickened in this manner. It is desirable that the polymer or prepolymer be soluble at room temperature both in the adhesive and in the activator.

The invention may contain additional ingredients which are well known in the art. For example, free-radical generators such as organic peroxides, peresters, peracids or persalts may be used alone or in combination with each other and may be included in the first part of the adhesive composition. Free-radical accelerators such as tertiary amines, as disclosed in U.S. Pat. No. 3,890,407, and sulfimides, such as 3-oxo-2,3-dihydrobenz[d]isothiazole-1,1-dioxide, commonly known as benzoic sulfimide or saccharin, may be employed effectively in the first part with good results in concentrations of less than 10% by weight of the first part, the preferred range being from about 0.1% to about 0.75%. Transition metal salts, as described in U.S. Pat. No. 3,591,438, herein incorporated by reference, may be effectively employed in either or both parts.

It is optional, but recommended, that chelators, cross-linking agents, and inhibitors be present in the adhesive composition for optimum performance. Chelators and inhibitors are effective in amounts of about 0.1 to about 1% by weight of the composition. The sodium salt of ethylenediamine tetra-acetic acid, 2,2-ethylenebisnitril methylidyne dipyridine and the class of Betadiketones are generally the most effective and are preferred. Cross-linking agents, optionally present in amounts from about zero to about 10% by weight of the composition, include such compounds as copolymerizable dimethacrylates.

The inhibitor concentration left over in the monomers from manufacture is often high enough for good stability. However, to insure maximum shelf life, the proportions mentioned above (about 0.1 to about 1% by weight of the composition) are recommended. Of those inhibitors which have been found of adequate utility is the group consisting of hydroquinones, benzoquinones, naphthoquinones, phenanthraquinones, anthraquinones, and substituted compounds of any of the foregoing. Additionally, various phenols can be employed as inhibitors, the preferred one being 2,6-di-tert-butyl-4-methyl phenol.

The amount of thickness, viscosity or thixotropy desired can be varied in accordance with the particular application required. Thickeners, plasticizers, diluents, and various other agents common to the art can be employed in any reasonable manner to produce the desired characteristics.

The invention will be appreciated further from the samples to follow, which are not meant in any way to restrict the effective scope of the invention.

EXAMPLES

Example 1

A two-part adhesive composition was prepared from the following ingredients, using the quantities shown.

| | parts by weight |
|---|---|
| Part One | |
| Polymerizable monomers | |
| 1. methyl methacrylate | 49.14 |
| 2. 1,3-Butylene glycol dimethacrylate | 0.98 |
| 3. Methacrylic acid | 9.83 |
| Chlorosulfonated polythylene | |
| 4. Hypalon 20 (Trademark of DuPont) | 34.40 |
| Additional Ingredients | |
| 5. Epikote 828 resin (trademark of Shell) | 4.91 |
| 6. Cumene hydroperoxide | 0.49 |
| 7. 2,6-Di (tertiary-butyl)-4-methyl phenol | 0.25 |
| | 100.00 |
| Part Two | |
| Mixture of butyraldehyde - aniline condensation product. | |
| Activator A - Activator of the Invention | |
| 8. DuPont Accelerator 808 enriched by distillation to contain 73% DHP by weight | used neat |
| Activator B - Prior Art Activator | |
| 8a. DuPont Accelerator 808 unenriched | used neat |

Epikote 828 is an epoxy resin used as a heat stabilizer for a Hypalon material. Cummene Hydroperoxide is part of a polymerization catalyst, of which the activator is the other part. The free-radical stabilizer is 2,6-Di(tertiary-butyl)-4-methyl phenol.

To prepare part one of the adhesive composition, the Hypalon material was dissolved in a mixture of the polymerizable monomer (ingredients 1,2,3). The additional ingredients, e.g. Epikote, cumene hydroperoxide and 2,5-Di(tertiary-butyl)-4-methyl phenol were then mixed in.

Several mild steel strips 2.5 cm. wide were vapour degreased for 5 minutes in 1,1,1-Trichloroethane at 75° C., immersed for 5 minutes in 1,1,1-Trichloroethane liquid at 75° C., removed therefrom and allowed to cool to room temperature. The surfaces to be bonded were then grit blasted with aluminum oxide powder at an air pressure of 5.5 kg/cm². The strips were again degreased above and allowed to cool to room temperature. Pairs of the strips were taken and for each pair, two rectangular areas 2.5 cm. × 1.3 cm. one on each strip, selected for adhesively securing together as laps. One of the laps was coated with the activator which was allowed to air dry for 1 to 2 minutes. Then a bead of the adhesive was applied to the other lap, and the laps were placed in contact separated only by a piece of metal wire to create a gap. (When no metal wire is used, the gap is conventionally designated as 0.05 mm.) The laps were secured together by clamping, allowed to cure for sixteen hours at room temperature, unclamped, and tested for the Tensile Shear Strength of the adhesive bond according to ASTM D-1002-64, except that the results were calculated in S.I. units.

The results are set below, distinguished according to whether Activator A (of the composition of the invention) or Activator B (of a conventional composition) was used. They are expressed in daN/cm² (deca-Newtons/cm²).

| | Activator | |
|---|---|---|
| | A | B |
| Max. width of gap | daN/cm² | |
| 0.05 mm | 331 | 319 |
| 0.5 mm | 217 | 198 |

The differences between the strengths measured using Activator A and Activator B, at a given gap width, are insignificant. This example accordingly shows that the bond strengths achieved by the compositions of the invention are in no way inferior to those achieved by the use of the prior art compositions.

Example 2

Ten two-part adhesive compositions were prepared, the adhesive in each case being the same as that of Example 1. Each composition however had a different primer; five contained DuPont Accelerator 808 and five contained 90% pure DHP prepared by fractional distillation as described above. It should be observed that the DuPont product contains about 40–50% DHP by weight. These products were dissolved in 1,1,1-Trichloroethane to give for each product five different concentrations making the ten primers.

Lapshear bonds were assembled in the manner described in Example 1, except that the activator was applied to both surfaces to be bonded, and that the gap in every case was created by the use of a piece of 1.25 mm diameter brass wire.

The tendency of the adhesive to slip over the activated surface was checked. The bonds, as in Example 1, were clamped and allowed to cure at room temperature for sixteen hours, then tested for Tensile Shear Strength.

The results are shown below.

| Activator active ingredient | % by weight in 1,1,1-Trichloroethane | Does the adhesive slip over the activated surface? | Tensile Shear Strength (daN/cm²) |
|---|---|---|---|
| DuPont Accelerator 808 | 15 | No | 28.8 |
| DuPont Accelerator 808 | 20 | Yes | 30.4 |
| DuPont Accelerator 808 | 30 | Yes | 34.4 |
| DuPont Accelerator 808 | 50 | Yes | 36.9 |
| DuPont Accelerator 808 | 80 | Yes | 46.6 |
| 90% pure DHP | 15 | No | 37.5 |
| 90% pure DHP | 20 | No | 36.5 |
| 90% pure DHP | 30 | No | 55.2 |
| 90% pure DHP | 50 | No | 68.4 |
| 90% pure DHP | 80 | No | 77.0 |

It is seen that the use of 90% pure DHP eliminates the problem of adhesive slippage. The conventional or DuPont activator, when diluted to 15%, admittedly also eliminates slippage, but the bond strength is unsatisfactorily low in that case.

Example 3

Two two-part adhesive compositions were prepared, the adhesive in both cases being the same as that of Examples 1 and 2. The compositions had different activators, the ingredients of which are tabulated below.

| Ingredient | Activator C (of the invention) (parts by weight) | Activator D (conventional) (parts by weight) |
| --- | --- | --- |
| DuPont Accelerator 808 | — | 50 |
| 90% pure DHP | 30 | — |
| Transition metal accelerator | 0.01 | 0.01 |
| 1,1,1-Trichloroethane | 69.99 | 49.99 |
| TOTAL | 100.00 | 100.00 |

This example is illustrative of the non-slip properties of the instant invention in slip-fit applications. To test these compositions, steel pins of external diameter 12.15 mm were bonded inside steel collars of internal diameter 12.7 mm. The pins and collars were degreased in 1,1,1-Trichloroethane in the manner set out in Example 1 above. The respective activator was applied to each pin surface which was allowed to dry. The adhesive was applied in a ring around the pin (onto the activated surface). The collar was then pushed down onto the pin over the adhesive layer. For each activator four bonds were prepared. They were allowed to cure for sixteen hours at room temperature. Bond strengths were measured by pushing the collars off the pins in a suitable testing machine at a rate of 0.2 cm/minute. Each result below is the average of four measured values.

| Activator C | 103 daN/cm$^2$ |
| --- | --- |
| Activator D | 84 daN/cm$^2$ |

The higher results obtained with Activator C are due to the fact that the adhesive does not slip over the activated surface as the collar is applied, but remains within the area intended to be bonded. The latter area was of course the same for both activators and was used for calculating the bond strength.

Example 4

The two-part adhesive compositions were prepared, the adhesive in both cases being the same as that of Examples 1, 2, and 3. The compositions had different activators, the ingredients of which are tabulated below.

| Ingredient | Activator E (parts by weight) | Activator F (parts by weight) |
| --- | --- | --- |
| 90% pure DHP | 30 | 30 |
| Transition metal accelerator | 0.01 | 0.02 |
| Thickener* | — | 8.3 |
| 1,1,1-Trichloroethane | 69.99 | 61.68 |

*A terpene phenolic resin (Hoechst Alresen PT191)

These compositions were tested on wood (Ramin) strips 2.5 cm wide. Pairs of strips were taken and for each pair two rectangular areas 2.5 cm × 1.3 cm were selected for bonding together as laps. Both of the laps in each pair were coated with the activator, which was allowed to air dry for 1 to 2 minutes. A bead of adhesive was applied to one of the laps and the laps were then placed in contact. They were secured together by clamping. The bonds were allowed to cure for sixteen hours at room temperature, the strips unclamped and the bonds tested for Tensile Shear Strength according to ASTM D-1002-64 except that results were expressed in the metric amounts of daN/cm$^2$, as opposed to psi.

| T-Shear Strength daN/cm$^2$ | Activator E daN/cm$^2$ | Activator F daN/cm$^2$ |
| --- | --- | --- |
| Ramin Gap 0.05 mm | 46.1 | 100.8 |

It is seen that the use of thickener considerably increases the tensile shear strength measured on wood over that observed with the unthickened primer.

The invention is not limited by or to the details of the specific embodiments described, many of which can undergo considerable variation without departing from the scope of the invention.

We claim:

1. A two-part adhesive composition comprising
   (i) a first part comprising a solution of a chlorosulfonated polyethylene in at least one polymerizable vinyl monomer, a polymerization catalyst, said catalyst comprising at least one free-radical initiator;

and
   (ii) A second part comprising an activator composition, the activator composition consisting of condensation reaction products formed by the reaction of butyraldehyde and aniline, said activator composition including at least about 70% by weight of N-phenyl-3,5-diethyl-2-propyl-1,2-dihydropyridine.

2. The adhesive composition of claim 1, wherein the content of N-phenyl-3,5-diethyl-2-propyl-1,2-dihydropyridine is about 80 to about 98% by weight of said activator composition.

3. The adhesive composition of claim 1 wherein the second part further comprises a solvent carrier of said activator composition.

4. An adhesive composition as in claim 1 wherein the second part further comprises a transition metal salt accelerator.

5. An adhesive composition as in claim 1 wherein the second part further comprises between about 2% and 20% by weight of the second part of an organic polymeric thickener soluble in both said adhesive parts.

6. An adhesive composition as in claim 5 wherein the polymeric thickener is a terpene phenolic resin.

* * * * *